Aug. 11, 1964   J. N. UNDERWOOD   3,144,413
CALCIUM CARBIDE MANUFACTURE
Filed Dec. 6, 1961   4 Sheets-Sheet 2
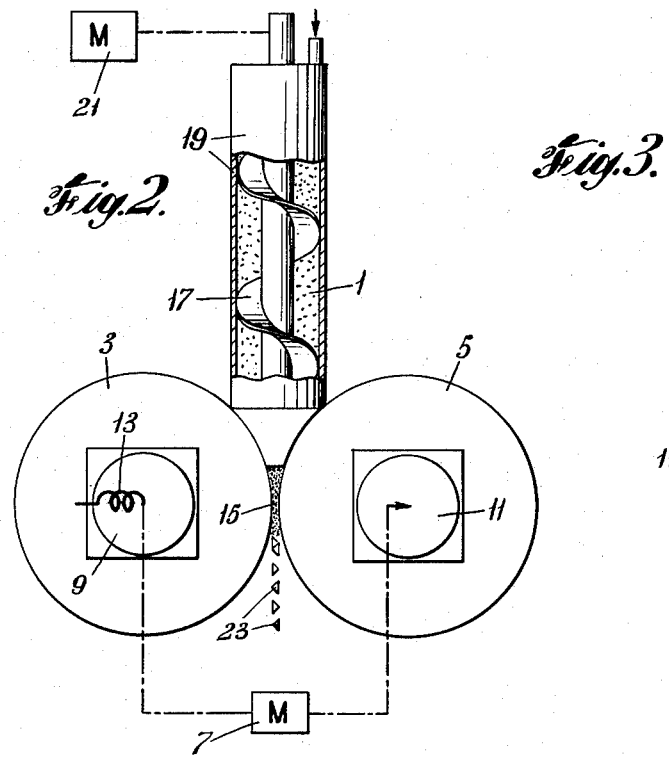
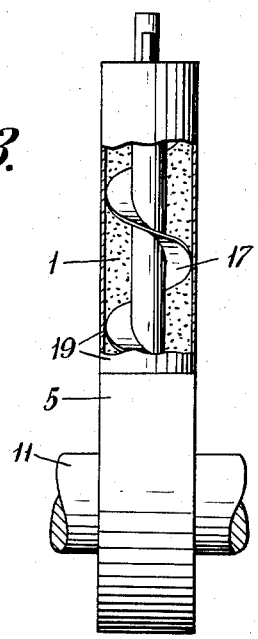
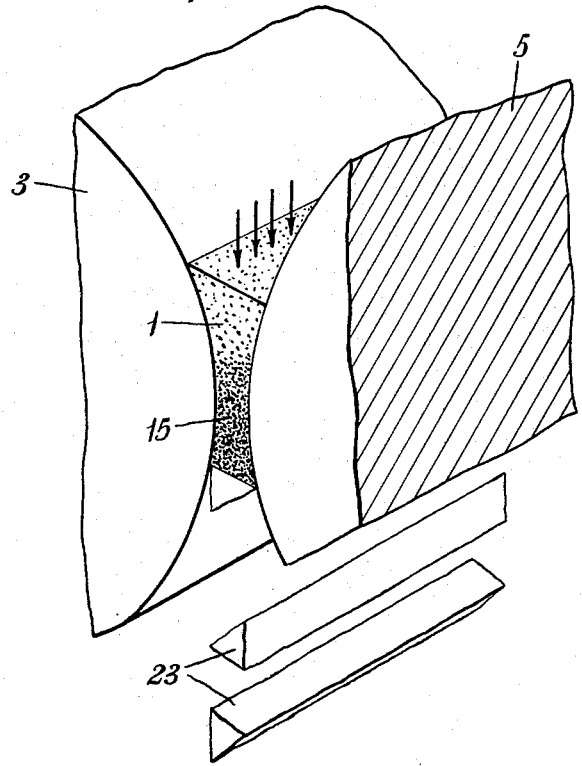
INVENTOR.
JOHN N. UNDERWOOD
BY Frederick J. McCarthy Jr.
ATTORNEY Aug. 11, 1964

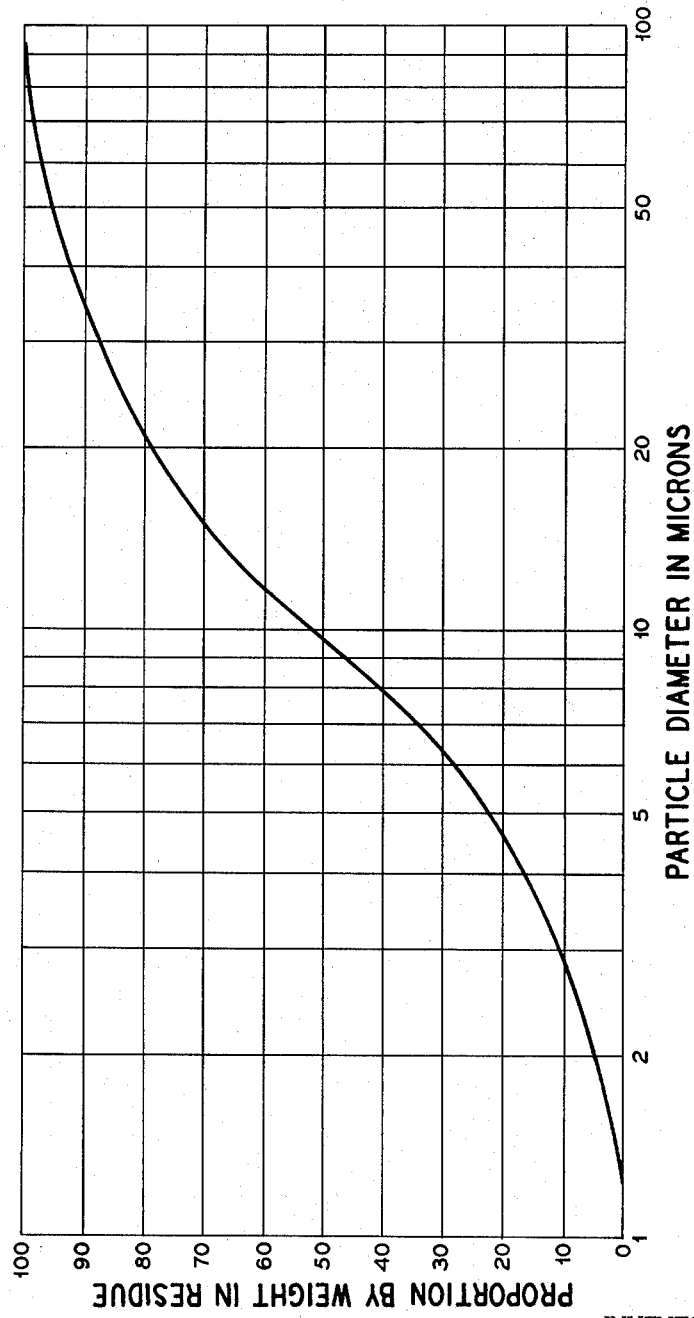

J. N. UNDERWOOD 3,144,413

CALCIUM CARBIDE MANUFACTURE

Filed Dec. 6, 1961

*INVENTOR.*
JOHN N. UNDERWOOD
BY Frederick J McCarthy Jr.

*ATTORNEY*

Aug. 11, 1964  J. N. UNDERWOOD  3,144,413
CALCIUM CARBIDE MANUFACTURE
Filed Dec. 6, 1961  4 Sheets-Sheet 4

INVENTOR.
JOHN N. UNDERWOOD
BY Frederick J. McCarthy Jr.

ATTORNEY

3,144,413
CALCIUM CARBIDE MANUFACTURE
John N. Underwood, Sanborn, N.Y., assignor to Union Carbide Corporation, a corporation of New York
Filed Dec. 6, 1961, Ser. No. 157,343
2 Claims. (Cl. 252—188.3)

The present invention relates to the manufacture of calcium carbide. More particularly, the present invention relates to a novel furnace feed for use in the manufacture of calcium carbide.

Although calcium carbide has been manufactured on an industrial scale for many years, the method of manufacture has changed but slightly since the introduction of the tappable furnace. Up to the present, the charge to such furnaces has been invariably comprised of relatively large lumps of burnt lime and coke, large sizes being used in order to provide sufficient permeability in the furnace charge bed to permit escape of the large volumes of gas evolved during the carbide forming reaction.

However, the use of relatively large sizes in the furnace charge, while improving bed permeability, necessarily results in a rather slow reaction rate due to the limited contact between the reactants. This undesirable condition is further aggravated by the tendency of the respective reactant materials to segregate due to density differences whereby the chemical balance of the furnace is adversely affected. In electric furnaces, the electrical balance is also adversely affected to a substantial extent by segregation of the reactant materials.

In addition to the above considerations relating to furnace operation, a further problem confronts the many calcium carbide manufacturers who generate acetylene directly from the product carbide.

This problem is the disposal of the lime hydrate material which is formed as a by-product in acetylene generation.

Although this material is chemically suitable for re-use in calcium carbide manufacture, its particle size is very small, most often averaging 70 percent less than about 17 microns. Consequently, the lime hydrate by-product material cannot be employed directly with advantage in carbide furnaces since it would be rapidly forced out by the gases generated therein.

Further, the small particle size of the by-product lime hydrate material makes the compacting thereof into aggregates extremely difficult, while process economics and product purity considerations most often exclude the use of special bonding materials.

As a result, while a portion of the lime hydrate is sometimes used in other chemical operations, most of this material is consigned to a dump and thus represents a significant economic detriment.

As can be seen, there is a dual problem confronting many calcium carbide manufacturers, (1) the need for an improved carbide furnace feed material which will ensure satisfactory bed permeability and efficient furnace operation, and (2), the need to reduce the expense of lime hydrate disposal.

It is therefore an object of the present invention to provide a feed material for calcium carbide furnaces which will ensure the maintenance of a permeable bed throughout the carbide forming operation.

It is another object to provide a non-segregating furnace feed material for calcium carbide manufacture.

It is a further object to provide a furnace feed material for calcium carbide manufacture which has a substantially increased reaction rate.

It is a still further object of the present invention to utilize the lime hydrate by-product of acetylene generation as a reaction material in the production of calcium carbide.

Other objects will be apparent from the following description and claims, taken in conjunction with the drawing in which:

FIGURE 1 shows a graph illustrating the size of the particles normally present in the lime hydrate residue derived from acetylene generation.

FIGURE 2 shows, somewhat schematically, a front elevation view, partly in section, of an apparatus suitable for the production of the novel furnace feed of the present invention.

FIGURE 3 shows a side elevation view of the apparatus of FIGURE 2.

FIGURE 4 shows, in perspective, a particular portion of the apparatus of FIGURE 2.

Figure 5:
FIGURES 5 and 6 are photographs of compacts of calcium carbide furnace feed material which were produced as transition products in the development of the present invention.

A furnace feed material in accordance with the present invention for the manufacture of calcium carbide is a compacted aggregate of carbon with calcium-bearing material which is reducible by reaction with carbon to produce calcium carbide, the compacted aggregate being formed in a substantially prismatic shape by the spontaneous fragmentation of a compacted mixture of calcium-bearing material and carbon. The prismatically shaped aggregate is characterized by having sufficient strength to resist disintegration during use as furnace feed material in the manufacture of calcium carbide.

A process for producing calcium carbide furnace feed in accordance with the present invention comprises compacting a finely divided mixture of calcium-bearing material and carbon between rolls to provide a product which is initially in substantially sheet form as it exits the rolls; and force-feeding the finely divided mixture entering the rolls at a pressure sufficient to cause the sheet-form product exiting the rolls to spontaneously fragment along a line substantially parallel to the axes of the rolls.

The aforementioned article of manufacture of the present invention and process for the manufacture thereof will be more clearly understood by reference to the drawing in which FIGURE 1 shows a typical size distribution of lime hydrate material which is obtained as a by-product from acetylene generation.

Such material, when obtained from acetylene generation processes using modern "dry" generators, most often has a free water content of less than about 1 percent and can be employed directly as the calcium-bearing material in the practice of the present invention. Other lime hydrate material having a free water content of less than about 5 percent can also be directly employed in the present invention.

In the practice of the present invention, finely divided lime hydrate material is admixed with finely divided bituminous coal or semi-bituminous materials such as Servell and Pocahontas coal. The proportions of the materials in the mixture are such that the aggregates which are subsequently formed therefrom will be suitable for the manufacture of calcium carbide. For example, to provide one pound of carbide requires 1.16 pounds of lime hydrate and 0.56 pound of carbon. However, depending on the grade of carbide to be produced, additional lime hydrate is added to the mixture.

The additional hydrate required for a given grade of carbide can be determined as follows:

$$\text{Additional hydrate} = \frac{74}{56}\left(\frac{100}{\text{percent } CaC_2 \text{ in product}} - 1\right)$$

In the usual case where a product containing 85 percent calcium carbide is desired, the amount of lime hydrate per pound of carbon in the mixture is 1.4 pounds.

The amount of coal required per pound of carbide depends upon the fixed carbon of the coal and can be calculated as follows:

Pounds of coal per pound of carbide $$= \frac{56}{\text{Percent fixed carbon of coal}}$$

Substantially all of the particles of coal in the mixture should pass a 32 mesh screen (Tyler). Preferably, the coal employed in the mixture is particulated by conventional techniques so that at least about 75 percent of the particles are sized through 80 mesh. A sizing of 80 percent through 200 mesh has been found to be highly satisfactory.

While a mixture of lime hydrate and bituminous coal is preferred in the practice of the present invention, up to about 20 percent by weight of the carbonaceous material can be anthracite coal.

When a suitable mixture of calcium-bearing material and carbon has been prepared, the finely divided material is force fed through smooth surfaced compacting rolls of an apparatus of the type shown in FIGURES 2 and 3 of the drawing.

With references to FIGURES 2 and 3, a finely divided lime hydrate-bituminous coal mixture indicated as 1, is fed between compacting rolls 3 and 5. The rolls 3 and 5 are rotated by means of the drive mechanism shown schematically as 7 which is engaged to roller shafts 9 and 11. Spring 13, connected to roll 3 provides a compacting force between the rolls. The compacting force provided by the spring or other suitable device is adjusted to be sufficient to transform the finely divided mixture of coal and lime hydrate into a compacted product 15 which is initially in sheet-form as it exits the rolls.

The screw-feed device 17, enclosed in housing 19 and driven by motor 21, is provided to force-feed the finely divided mixture of carbon and calcium-bearing material between the compacting rolls.

It has been discovered, as part of the present invention, that if sufficient force feeding pressure is applied to the mixture entering the rolls, the sheet form product exiting the rolls will spontaneously fragment along a line substantially parallel to the roll axes with the result that substantially uniform prismatically shaped compacts will be automatically produced. These prismatically shaped compacts are indicated as 23 in FIGURES 2 and 4.

While the exact force feeding pressures and roll pressures required to produce the prismatically shaped compacts of the present invention cannot be precisely specified for all types of compacting apparatus, the particular combination of pressures required in any specific instance can be readily determined by adjusting the compacting rolls to produce an initially sheet form compact and increasing the force-feeding pressure until the sheet form material sponstaneously fragments along a line substantially parallel to the axes of the compacting rolls. At this force-feeding pressure, and at higher pressures, the prismatically shaped compacts of the present invention will be automatically produced.

At higher force-feeding pressures the line of fracture tends to become somewhat curved and the compacts perhaps slightly cracked; however, the product obtained is substantially prismatic in shape and is highly suitable as a furnace feed in most calcium carbide manufacturing operations.

To further illustrate the product and process of the present invention, FIGURE 5 is provided which shows a photographic representation of the product which is obtained from a compacting apparatus of the type shown in the drawing when little or no force-feeding pressure is applied to the coal-lime hydrate mixture entering the compacting rolls.

The material shown in FIGURE 5, when used as furnace feed, most often arranges itself in substantially parallel planar distribution and consequently seriously degrades furnace operation by interfering with the evolution of gas from the furnace.

Figure 6:

FIGURE 6 shows the product obtained using the same apparatus when somewhat increased force-feeding pressure is applied to the coal-lime hydrate mixture. This product, while providing somewhat improved furnace bed permeability nevertheless interferes with the evolution of gas from the furnace and in addition tends to fragment into small size particles during furnacing which further reduces its value as a feed material.

Figure 7:
FIGURES 7, 8 and 9 are photographs of the novel furnace feed material of the present invention.

FIGURE 7 shows the product which is obtained from the same apparatus when sufficient force-feeding pressure is applied to cause spontaneous fragmenting of the compacted sheet-form material along a line parallel to the roll axes as it exits the rolls; the prismatic and substantially uniform material of FIGURE 7 represents the product of the present invention.

Figure 8:
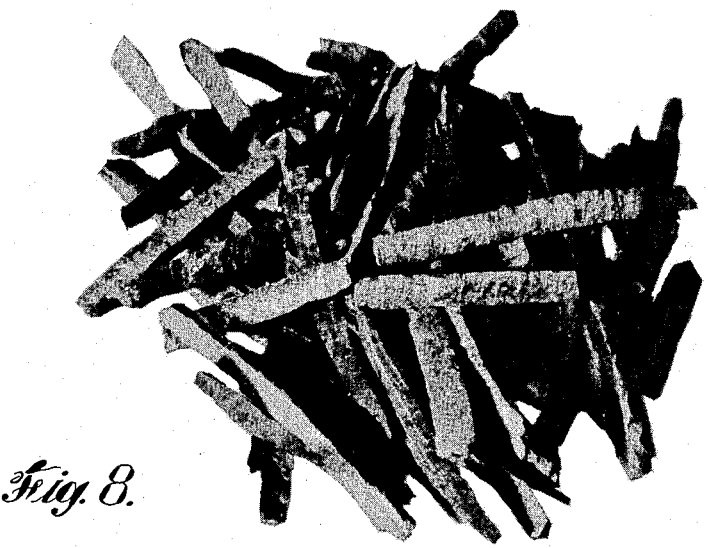
Figure 9:
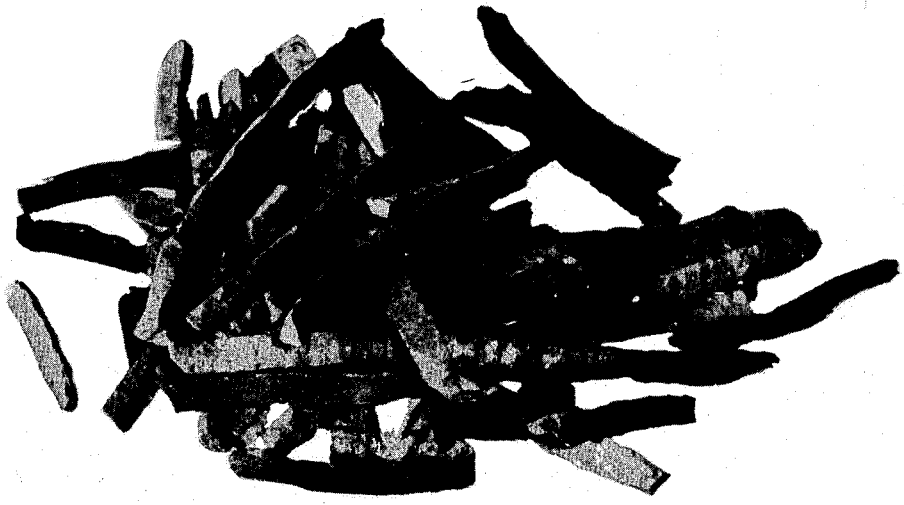

The material shown in FIGURES 8 and 9 is the product obtained when the force-feeding pressure is further increased. It can be seen in FIGURE 8 that, for increased force-feeding pressures, the sides of the prismatic compacts are slightly curved. With further increases in force-feeding pressure, slight cracking appears in some of the prisms as shown in FIGURE 9. The material shown in FIGURES 8 and 9 also represents the product of the present invention.

The following example is provided to further illustrate the relative effect of force-feeding in the manufacture of calcium carbide furnace feed.

EXAMPLE I

Thirty-five parts of bituminous coal (67 percent fixed carbon) were mixed with 65 parts acetylene by-product lime hydrate. The coal was sized to 200 mesh by D (Tyler screens).

The mixture was compacted using an apparatus of the type illustrated in the drawing. A specific description of the apparatus is as follows:

Screw feed drive motor __ 2 horsepower, 5.6 ampere, 220 volt A.C. single phase, 1740 r.p.m.

Screw feeder _____ 5 inch diameter worm, 2 inch pitch.

Rolls _____ Cast iron, smooth surfaced 16 inch axial length; operated at 3 to 6 r.p.m.

Compacting force between rolls _____ 3 to 5 tons per inch of roll axial length (18 to 30 tons total).

In the course of compacting the coal-lime hydrate mixture, the force feeding pressure was varied by controlling the screw feed drive motor. The compacted products obtained for increasing force-feeding pressures (indicated as motor load current) are set forth below:

| Force-Feeding Pressure (Motor Load-Amperes) | Type Product | Illustrated In Figure No. |
| --- | --- | --- |
| 1.5 to 2.0 | Irregular Flakes | 5 |
| 2.0 | Irregular Cracked Flakes | 6 |
| 2.0 to 2.5 | Prisms | 7 |
| 2.5 to 4.0 | Slightly Curved Prisms | 8 |
| 6.0 to 8.0 | Slight Curved Prisms with slight cracking. | 9 |

The following Examples II and III are provided to illustrate particular embodiments of the present invention.

EXAMPLE II

Using the apparatus described in Example I, the worm of the screw-feed device was continuously driven at about 30 r.p.m. to force feed the coal-lime hydrate mixture into the compacting rolls. A sheet form compact was produced which upon exiting the rolls spontaneously fragmented along a line parallel to the roll axes into prismatically shaped compacts. The prismatic compacts were between about 1½ and 4 inches long with faces between ⅕ and 5/16 inch and were produced at a rate of between 300 and 600 pounds per hour. A sample of the prismatic compacts is shown in FIGURE 7.

EXAMPLE III

Thirty-three parts of bituminous coal were mixed with 67 parts acetylene by-product lime hydrate. The coal was sized to 48 mesh by D (Tyler screens).

The mixture was compacted using a roll apparatus of the type illustrated in the drawing, however, a different force-feeding mechanism was employed. A specific description of the apparatus is as follows:

Rolls _____ Smooth surfaced, 24 inch diameter, 8 inch axial length; operated at 2 to 2½ r.p.m. with a minimum clearance of 0.03 inch being maintained between the rolls.

Compacting force between rolls ___ 3 to 13 tons per inch of roll axial length.

Feed mechanism __ A vertically positioned feed box of rectangular cross section (4" x 8") arranged coextensive with the rolls and directly above and closely adjacent the opposing roll faces; a weighted loose fitting plunger was provided for force feeding.

Using the above-described apparatus the lime hydrate coal mixture was force fed into the rolls at a pressure of about 5 pounds per in.². Plates were located at the ends of the rolls to cover the space between the rolls and the feed box to prevent loss of lime hydrate-coal mixture. A sheet form compact was produced which upon exiting the rolls spontaneously fragmented along a line parallel to the roll axes which resulted in the production of prismatically shaped compacts.

The above procedure was repeated in which the coal in the mixture was sized to 100 mesh by D (Tyler screens) with substantially the same results.

The aforedescribed prismatically shaped compacts offer many advantages as furnace feed material in calcium carbide manufacture. For example, when the compacts of the present invention are used in a carbide furnace, they arrange themselves, on account of their substantially uniform and prismatic shape, into a highly permeable bed which presents a minimum amount of interference with the evolution of gas from the furnace.

Moreover, it has been found, that, as a calcium carbide-forming material, the compacts of the present invention are highly reactive as compared to other previously used carbide feed materials and provide increased efficiency in furnace operation. Additionally, the prismatic furnace feed of the present invention presents a very high resistance when used in electric furnaces which results in substantially improved electrical efficiency. Further, the prismatic compacts of the present invention were found to be self-feeding into the reaction zone around the furnace electrodes due mainly to the unique and substantially uniform shape of the compacts.

It has also been found that when using the furnace feed of the present invention, furnace operation is exceptionally quiet with no "blows" or other disturbances, and as melting of the charge progresses the compacts gradually settle downward due to their own weight and little if any "stoking" or "barring" of the furnace bed is necessary.

Additionally, the calcium carbide which is produced using the furnace feed of the present invention has been found to produce high and substantially uniform yields of acetylene per pound of carbide.

Other advantages which are derived from the novel furnace feed of the present invention are due to the considerable strength of the prismatic compacts which neither break during furnacing nor produce any substantial amount of fines or dust. In this regard it has been found that not only do the prismatic compacts of the present invention have considerable strength in the as-formed condition, but that the compressive strength of the prismatic compacts is increased by exposure to increasing temperatures as high as about 1400° C. Experimental data illustrating this advantageous property are set forth in Table I.

*Table I*

| Compressive Strength, lbs. (measured at room temperature): | Temperature to which compacts were exposed, °C. |
|---|---|
| 18 | As-Rolled |
| 28 | 105 |
| 29.5 | 300 |
| 44 | 500 |
| 51 | 750 |
| 59 | 1400 |

The compressive strength data of Table I was obtained by first heating a compact of the present invention at a specified temperature. The compact was then cooled to room temperature and placed on a paten which was supported by a weighing device. Pressure was applied vertically to the compact through a rounded bar placed transversely to the longitudinal axis of the compact. The pressure was increased until crushing of the compact was accomplished. The load thus applied was continuously measured by the weighing device and the maximum value applied before crushing was noted as the compresive strength.

The following Examples IV through VII are provided to illustrate the advantage of the prismatic compacts of the present invention as furnace feed material in the manufacture of calcium carbide.

EXAMPLE IV

Prismatically shaped compacts of the present invention were formed in apparatus of the type illustrated in the drawing from a mixture of 65 parts of lime hydrate and 35 parts coal (75% fixed carbon). The coal was sized to 80 mesh by D (Tyler screens). Four lots of compacts of about 10 pounds each were consecutively charged to and melted in a laboratory single phase furnace. In all instances the gases evolved in the furnace escaped through the charge without difficulty and burned quietly on the surface of the charge. Very little fuming resulted from the furnace operation. The product of the four taps resulting from the separate charges provided an average of 4.95 cubic feet of acetylene per pound which is equivalent to about 83 percent carbide content in the furnace product.

EXAMPLE V

A continuous pilot scale test was conducted in a 2-electrode single phase furnace having a hearth 60 inches long, 33 inches wide, and 32 inches deep. The first ten taps obtained from the furnace were derived from a charge of 200 parts burnt lime (95.4 percent CaO average) and 120 parts of coke (91.3 percent fixed carbon). The lime was sized to 83 percent 1 inch by ¼ inch and the coke 87 percent 1 inch by ¼ inch. The average power input to the furnace for this charge was 587 kilowatts at an average voltage of 54 volts at the electrodes. The maximum and minimum gas yields obtained from the carbide produced as above-described were 4.20 and 5.40 cubic feet per pound.

During carbide production furnace operation was rather rough at the top, particularly just before the tapping period. Build up of charge material in the hearth caused tapping difficulties.

EXAMPLE VI

In continuation of the test described in Example IV, prismatic lime hydrate-coal compacts of the present invention were fed into the furnace. The compacts were formed from a mixture of 65 parts lime hydrate and 35 parts coal (67 percent fixed carbon). The coal in the mixture was sized to 200 mesh by D (Tyler screens).

The eleventh through fifteenth taps obtained from the furnace were a transition product derived while changing from the standard burnt lime-coke charge to prismatic compacts. Furnace operation improved considerably during the transition period and the average gas yield per pound of produced carbide was 5.43 cubic feet.

The subsequent taps 16 through 23 were produced entirely from prismatic compacts of the present invention. The average furnace power input during the production of these taps was 577 kilowatts with an average electrode voltage of 54.1.

The maximum and minimum gas yields obtained from the carbide produced in taps 16 through 23 were 4.60 and 5.30 cubic feet per pound.

When using the prismatic compacts of the present invention as feed, furnace operation was very quiet with no "blows" or other disturbances. The prismatic compacts settled into the furnace by gravity as melting progressed and practically no "stoking" or "barring" of the furnace charge was required. The gases evolved in the furnace passed easily through the furnace charge and burned in the furnace.

EXAMPLE VII

Subsequent taps were produced using only prismatic compacts described in Example VI as furnace feed. Due to the relatively high resistance of the compacts it was possible to raise the electrode voltage to 70 volts and the power input to 664. The average gas yield of the carbide product obtained was 4.73 cubic feet per pound. Furnace operation was quiet and trouble-free throughout.

Further tests showed that electrode voltages as high as 80 volts could be used to manufacture calcium carbide from the prismatic compacts of the present invention.

It is considered to be clear from the foregoing description and examples that the novel calcium carbide furnace feed and process for the manufacture thereof represent a highly beneficial contribution to the art which is of considerable industrial utility.

What is claimed is:

1. In a process for producing calcium carbide furnace feed by compacting a finely divided mixture of calcium-bearing material and carbon between rolls to provide a product which is initially in substantially sheet-form as it exits the rolls, the improvement which comprises force-feeding the finely divided mixture of calcium-bearing material and carbon between the rolls at a pressure which is sufficient to cause the sheet-form product exiting the rolls to spontaneously fracture along a line substantially parallel to the axes of said rolls whereby substantially prismatically shaped compacts of said mixture of calcium-bearing material and carbon are produced.

2. In a process for producing calcium carbide furnace feed by compacting a finely divided mixture of calcium-bearing material and carbon between rolls to provide a product which is initially in substantially sheet-form as it exits the rolls, the improvement which comprises maintaining the compacting force between the rolls at above about 3 tons per inch of roll length and force-feeding the finely divided mixture of calcium-bearing material and carbon between the rolls at a pressure which is sufficient to cause the sheet-form product exiting the rolls to spontaneously fracture along a line substantially parallel to the roll axes whereby substantially prismatically shaped compacts of said mixture of calcium-bearing material and carbon are produced.

References Cited in the file of this patent

UNITED STATES PATENTS

| | | |
|---|---|---|
| 1,292,386 | Becket | Jan. 21, 1919 |
| 1,872,202 | Williams | Aug. 16, 1932 |
| 2,674,581 | Balcar et al. | Apr. 6, 1954 |
| 2,993,761 | Erasmus | July 25, 1961 |